Aug. 20, 1963   D. A. TAYLOR   3,101,037
DETACHABLE VENTILATING SEAT COVER FOR AUTOMOBILE SEATS
Filed May 29, 1961   3 Sheets-Sheet 3

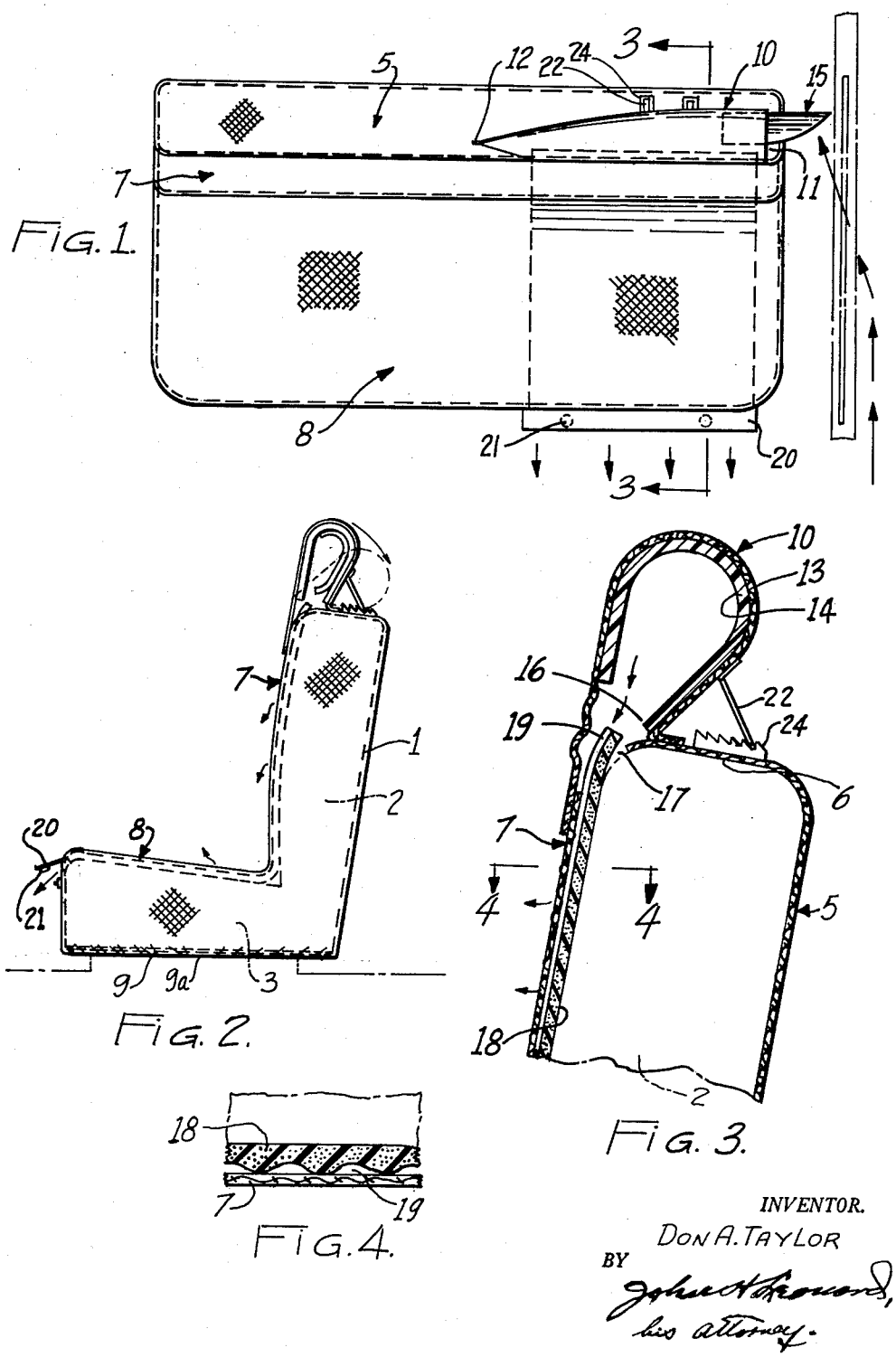

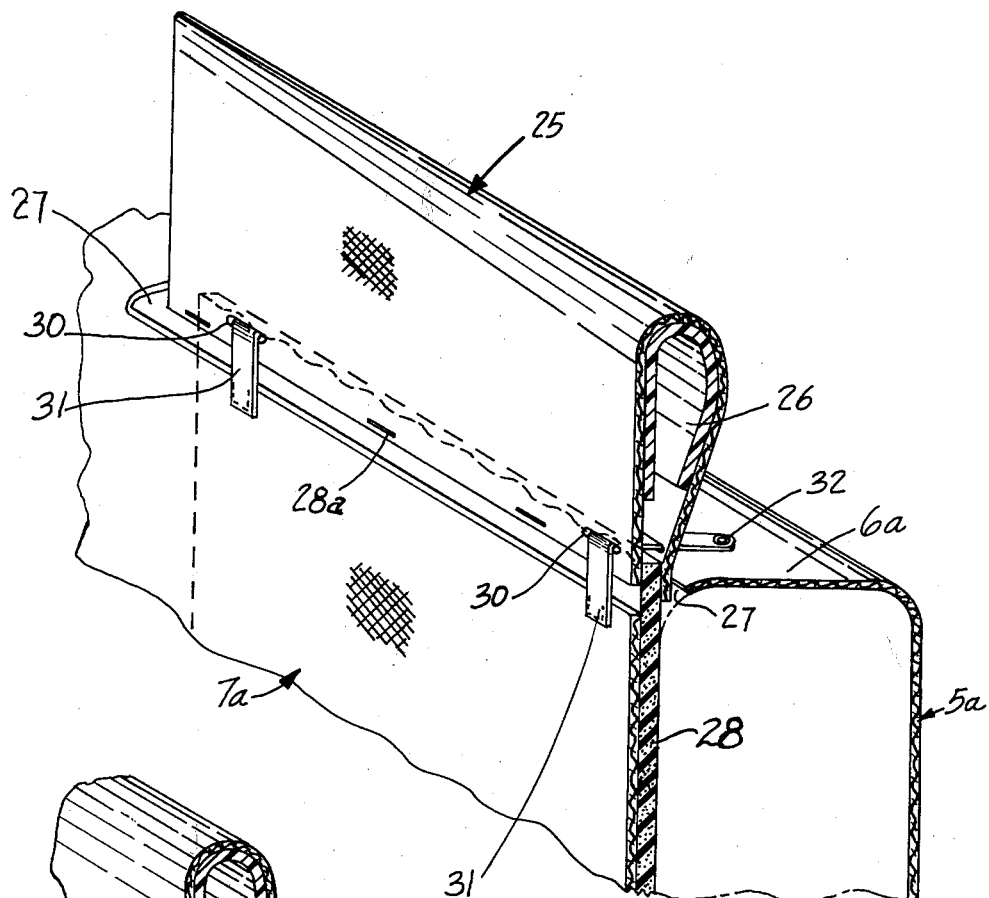
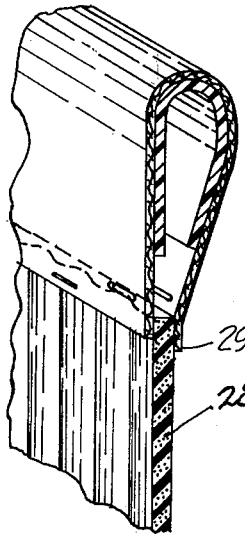
Fig. 5.
Fig. 6.

INVENTOR.
DON A. TAYLOR
BY
his attorney.

United States Patent Office 3,101,037
Patented Aug. 20, 1963

3,101,037
DETACHABLE VENTILATING SEAT COVER
FOR AUTOMOBILE SEATS
Don A. Taylor, 216 Mill St., Box 4, Wadsworth, Ohio
Filed May 29, 1961, Ser. No. 113,535
13 Claims. (Cl. 98—2)

This invention relates to detachable seat covers for upholstered automobile seats and particularly to a seat cover which is arranged to be detachably secured in position on the cushioned seat of an automobile so as to snugly fit the seat cushion and the seat back and be held in relatively fixed position thereon during use.

Generally, such seat covers are made of cloth fabric or plastic sheets or films. They range from the less expensive ones which can be readily adjusted and installed by the car user to the expensive ones which are tailored accurately to the specific seat. The former are generally held in place on the seats either by elastic bands, tie ribbons, snapfasteners, or zippers. The latter draw a cover quite tightly on the seat.

A large selection of these detachable covers are available on the market, primarily for use in protecting the original fabric of the automobile seat. Many are made of transparent plastic material so that the design of the seat fabric is visible therethrough. However, they all have one common drawback, in that they are either of relatively tight woven cloth or of plastic sheet material, which greatly reduces ventilation that otherwise might be obtained. The fabric is slow to absorb moisture and to permit its evaporation. The plastic, though very desirable, is moisture-proof.

Even the covers of woven plastic threads are almost impervious to air and moisture. All covers of plastic sheets and threads become exceedingly hot when they have been exposed to the hot sun for a short interval. This factor, combined with their being substantially impervious to moisture, renders them very uncomfortable in warm weather.

Because of these objections, so-called ventilated seat pads have been provided. A pad of this type is disclosed in my copending application, Serial No. 100,317, filed April 3, 1961, and entitled, Ventilating Hood for Seat Cushions. As therein described, such pads usually comprise a series of coiled springs arranged side by side with their axes in the plane of the pad. They are usually covered with a loose and coarse knit woven fabric covering which permits air to circulate therethrough into the space within the springs and thus flow freely between the user's body and the normal fabric covering of the automobile seat back and cushion. However, these separate pads do not altogether provide adequate circulation. Also they are objectionable in that they become shifted out of place by the user's body. Their shifting not only results in discomfort, but also in wear of the seat fabric. Again, the springs often break and the broken ends tear and snag the seat fabric or the clothes of the user, and, in some cases, injure the user himself.

The object of the present invention is to provide a detachable seat cover of a general type which snugly detachably fits the back and seat cushions of an automobile seat, and holds its position thereon, yet which includes ventilating means which provide very efficient ventilation through the front of the seat back cover portion and through the seat cushion cover portion.

Another object is to provide a ventilating seat cover which is relatively inexpensive, and which can readily be removed, washed, and reinstalled, if desired.

Another object is to provide, in a detachable seat cover, ventilating means in which the ventilation can be adjusted readily.

A more specific object is to provide a ventilating seat cover which can be used with a ventilating seat pad and, in addition to improving ventilation, eliminates the objectionable shifting of the seat pad.

Various other objects and advantages will become apparent from the following description, wherein reference is made to the drawings, in which FIG. 1 is a top plan view of an automobile seat with the seat cover and ventilating means of the present invention installed thereon;

FIG. 2 is a side elevation of the structure illustrated in FIG. 1;

FIG. 3 is an enlarged, fragmentary, vertical sectional view taken on the line 3—3 in FIG. 1;

FIG. 4 is an enlarged fragmentary horizontal sectional view taken on the line 4—4 in FIG. 3;

FIG. 5 is a fragmentary perspective view, partly in section, showing a modification of the invention;

FIG. 6 is a fragmentary perspective view of a portion of the cover illustrated in FIG. 5;

Figure 7:
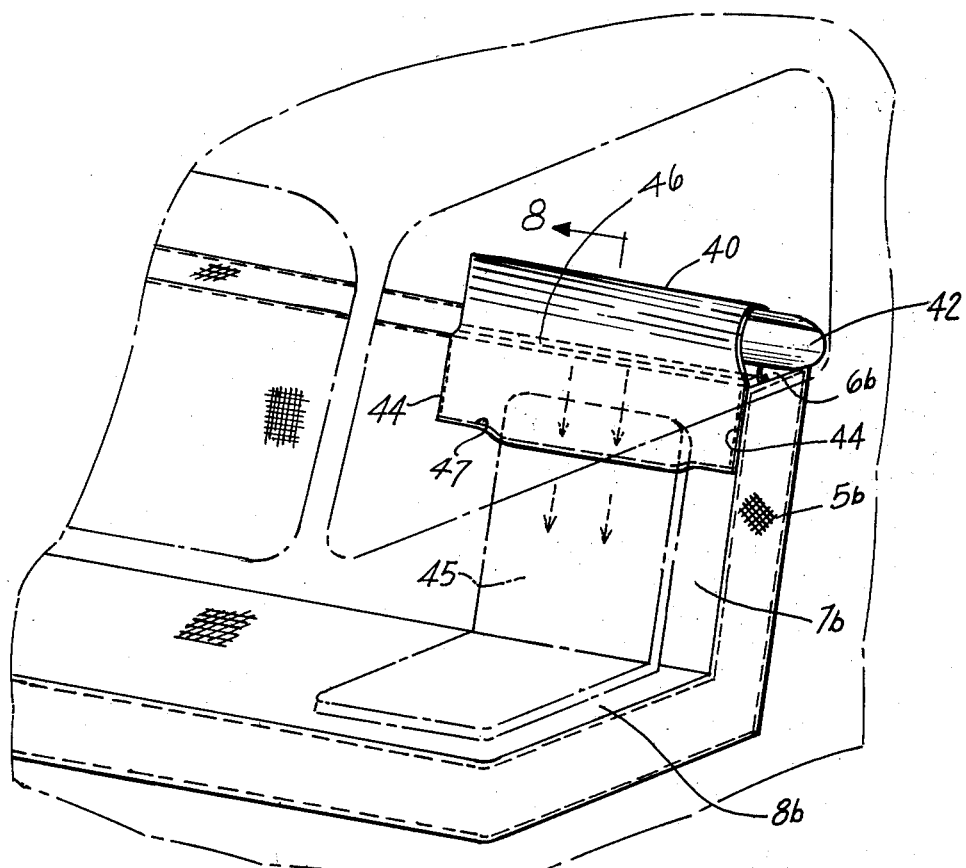
FIG. 7 is a perspective view of another modification of the invention.

Referring first to FIGS. 1 through 4, the invention is shown as installed on an undivided type of front seat 1 of an automobile. The seat 1 has an upright back portion 2 and a horizontal seat portion 3, both the back portion and the seat portion being upholstered in a conventional manner.

The seat cover, indicated generally at 5, has an upper or crown portion 6 adapted to snugly fit the upper portion of the seat back, a front portion 7 adapted to overlie the front face of the seat back 2, and a seat portion 8 adapted to overlie the upper face of the seat cushion 3. The seat cover shown is one which has edge portions which overlie the edges of the seat back and cushion, and a rear portion which covers the entire rear face of the seat back or, if desired, the upper portion only thereof. The cover shown for illustration is of woven cloth fabric, though it may be of woven or sheet plastic, or other materials, if desired. The manner of fastening the cover to the seat may be conventional, such as by suitable ties, draw strings, zippers, or snap fasteners, the important feature being that the seat cover is one which is detachable and holds its position on the seat.

In the form illustrated in FIGS. 1 through 4, detachability is provided by means such as an elastic band 9 which is accommodated in a tunnel 9a extending entirely about the periphery of the open bottom of the cover and can contract beneath the peripheral margin of the underside of the seat cushion. The seat cover 5 is provided with a hood 10 which is connected thereto adjacent the juncture of the forward edge of the crown portion 6 and the upper edge of the front portion 7 by sewing, lacing, conventional zippers, or snap fasteners, as desired. The hood 10 extends transversely of the seat cover, from an outboard edge thereof toward the transverse midportion. The hood 10 is elongated endwise and is open at its outboard end 11 and closed or restricted at its inboard end 12. It is open downwardly so that air entering its outboard end 11 flows downwardly behind the front portion 7 of the seat cover. The hood as a whole is flexible and resilient, but its walls are relatively stiff, self-supporting and self-restoring. However, it is desirable that the ventilating structure be inexpensive, and likewise removable so that the cover can be readily cleaned and laundered. For this reason, the hood 10 is composed of an outer fabric 13 which may be very soft, flexible and readily foldable; for example, a part of the same fabric of which the seat cover itself is formed. For rendering it relatively stiff and resilient, and yet self-supporting, a suitable reinforcing channel 14 which is closed at its inboard end and open at its outboard end is provided. This channel is arranged to be inserted, closed end foremost, into the hood fabric 13 and fit snugly therein. Preferably, the channel 14 is composed of a relatively strong sheet of set organic plastic material having enough resiliency so that it can be warped into shape, inserted in the hood fabric and released therein, and thereupon expands and frictionally binds itself in place. So-called high impact vinyl is an example.

An air scoop 15 is provided. This air scoop also is in the form of a channel of like material which, likewise, when compressed laterally, is inserted endwise in the channel 14 and released, tending to restore itself and thereby bind itself frictionally in telescoping relation in the channel 14.

With this arrangement, the scoop 15 can be slid inwardly and outwardly endwise of the hood to the position desired. Preferably it is of such length that it can readily be extended to reach through and slightly outwardly of the window opening of an automobile door, or pushed inwardly to retracted position in which it is totally inside of the door with little or no portion extending out of the outboard end of the hood. Thus it may readily be adjusted by the operator while he is driving the automobile, to increase and decrease the flow of air in accordance with the changing weather and temperature conditions during a trip.

The channel 14 has its open side, as indicated at 16, facing downwardly so that air entering is forced into the channel 14 by the scoop 15 and vents downwardly behind the front portion 7 of the seat cover. At the open side 16 of the channel, the seat cover is slit, as indicated at 17, so as to provide communication between the hood and the interior of the seat cover immediately behind the portion 7.

In order to assure adequate flow of air downwardly along the back of the portion 7 and along the underside of the seat portion 8, a suitable conducting member or ventilating cushion means 18 is interposed between the seat cover and the seat back and cushion, so as to lie with its forward face juxtaposed against the back or inner face of the front portion 7 and against the bottom or inner face of the seat cushion cover portion 8.

The member 18 is provided with a plurality of passages 19, which are arranged for receiving air from the hood at their upper ends, conduct it downwardly along the seat back and then forwardly of the seat cushion, forwardly of the member 18 en route. The passages 19 preferably are in the form of a plurality of channels which extend from a location generally adjacent the upper end of the cover portion 7 entirely to the bottom thereof and are open forwardly, and thence forwardly beneath the portion 8 and opening upwardly. The member 18 preferably is of a flexible material. A preferred form is one which is composed of a sheet of wide mesh, strong net fabric offering little resistance to the flow of air therethrough and narrow strips of foam rubber bonded thereto. The strips extend from adjacent the hood to the front of the seat cushion 3 and they are spaced apart transversely of their length from each other. Thus air entering the hood 10 passes readily downwardly and outwardly through the front portion 7 and cushion portion 8 of the cover.

These cover portions, of course, are either woven fabric of sufficiently large mesh to permit a relatively free flow of air therethrough or sheet plastic. If the latter, they are perforated so as to provide a large number of apertures that are well distributed over the seating and back area.

Thus, upon forward motion of the automobile, air striking the scoop 15 is deflected into the hood 10 and then passes along the channels 19 diffusing through the front portion 7 and the seat cover portion 8.

Often it is desirable to direct some portion of this air downwardly toward the foot area. For this purpose, a suitable flap 20 is provided on the seat cover adjacent the forward edge of the seat cushion cover portion 8. The cover has a slit or passage at this location aligned with the open ends of the channels 19. The flap 20 is arranged for movement into and out of obstructing relation with the air being discharged from the channels. Ordinarily, the flap 20 extends forwardly and downwardly so that whatever air issues at the forward ends of the channels is deflected downwardly and prevented from directly striking the legs of the operator or passenger. However, the flap 20 may be provided with snap fasteners 21 which cooperate with conventional companion parts on the cover, so that it can be buckled down along all or a portion of its length, thus changing the ventilating effects.

Generally, the hood 10 extends above the level of the seat to the position at which it is about even with the head of the operator. There is a tendency, therefore, for the operator to lean back and use it as a head rest. Sometimes the material of the hood is not strong enough for this purpose, or the fabric of the seat cover would be overstressed thereby. Accordingly, a suitable brace 22 is provided. This brace 22 is hingedly connected to the rear of the hood 10 near its top. The hinged connection may be a conventional hinge or one provided by sewing or fastening of heavy fabric to the brace and then to the hood. The seat cover on the crown portion 6 is provided with a suitable brace retaining means 24, having notches in which the lower rear edge of the brace 22 may be received. The brace 22 may be in the form of a relatively stiff sheet substantially coextensive endwise with the hood. The brace retaining means 24 may be two identical members, arranged one near each end of the brace and secured in fixed position on the crown 6 of the hood 10 in any suitable manner, as by stables, sewing or the like. The front margin of the hood may be sewn or stapled to the cover portion 7. Generally enough excess fabric is left adjacent the juncture so that the fabric will not be overstressed when the hood is pushed back onto the crown 6 by the operator's head. The channel 14 preferably is not attached to the hood but is left only frictionally attached so that it can readily be removed when the cover is to be laundered. The member 18 preferably is also left unfastened for a like reason. However, it and the brace 22, and retainer 24 may be secured in place by snap fasteners for ease in removal.

Referring next to FIGS. 5 and 6, a modification of the invention is illustrated. In this form, a hood 25 corresponding to the hood 10 is provided and includes a channel insert 26 similar to the channel. The seat cover, indicated at 5a, has a crown portion 6a and a front portion 7a, combined with the hood 25. For this purpose, the cover is provided with a slit 27 at the juncture of the forward edge of the top of the seat and the front portion 7a. This slit can readily be provided by cutting the stitching of the conventional seat cover. The front lower margin of the fabric of the hood 25 is stapled to the upper forward portion of a conducting member 28 by suitable staples 28a, or, if desired, it may be sewn thereto. The rear margin 29 of the hood 25 is correspondingly fastened to the member 28. The member 28 has a channelled forward face, as does the member 18. The hood 25 is provided with a number of rows of apertures 30 disposed along its length adjacent its lower forward and lower rear margins. The front portion 7a is provided with suitable straps or tie bands 31 which are spaced apart so that each tie band can extend through a pair of aligned front and rear apertures 30 in the hood 25. At its free ends, each band 31 is secured by suitable snap fasteners, as indicated at 32, to the crown portion 6a. The tie bands serve to reinforce the hood and cover, and to prevent opening up of the slit 27 at the juncture of the front portion 7a and crown portion 6a of the seat cover. Thus the hood and member 28 form a separate unit which can be installed by inserting the member 28 through the slit 27, and securing the unit in place by the straps 31. A scoop, similar to the scoop 15, is provided.

Figure 8:
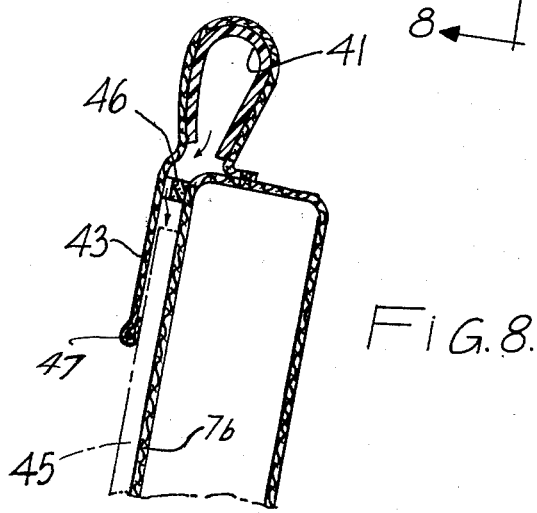
FIG. 8 is a vertical sectional view taken on the line 8—8 in FIG. 7.

Referring next to FIGS. 7 and 8, another modification is shown for use when the user of the car wishes to use the conventional ventilated seat pads.

In this form, the seat cover, indicated generally at 5b, has a crown portion 6b, a front portion 7b, and a seat cover portion 8b, corresponding to the portions 5 through 8, respectively, heretofore described.

It is also provided with a hood 40 having an insert channel 41 and a scoop 42 which may be the same as the channel 14 and scoop 15 heretofore described. If desired, in all forms, the scoop may be integral with the channel insert.

In this form, instead of the hood opening downwardly through a slit in the cover between the top of the crown portion 6b and the upper margin of the forward front portion 7b, a flap 43, which is a continuation of the forward lower margin of the hood, extends downwardly into overlapping forwardly spaced relation to the forward face of the portion 7b of the cover. To secure it into place, the flap 43 is stitched or otherwise secured at its ends to the portion 7b, as indicated at 44, but is open at the bottom. At the top it is in communication with the hood. Thus it forms a downwardly open pocket along the upper margin of the front 7b of the seat cover.

This pocket is arranged to receive the upper end portion of the back of a conventional ventilating seat pad 45. A grooved spacer 46 is interposed between the flap 43 and cover to assure ample air passage into the pocket. An elastic cord 47 is provided at the lower margin of the flap 43 for gripping the seat pad. This arrangement causes air to discharge downwardly through the pad while, at the same time, holding the pad more effectively in place on the seat. At the same time, it permits a certain amount of ventilating air to flow downwardly along the lateral edges of the pad. In this form, too, the channel insert 41 is readily removable so that, upon removal of the seat cover from the seat, the cover can be laundered readily.

In order to assure that the upper end of the pocket be kept open to receive air from the hood and not pinched closed by the head of the operator, a suitable plastic sleeve 46 is provided and held in place in the hood by the conventional snap fasteners so that it can readily removed for purposes of laundering.

It is apparent from the foregoing description that a seat cover of flexible perforate material having a crown portion for detachably and snugly accommodating the top portion of the seat back, having a front portion overlying the front of the seat back, and a seat portion overlying the top of the seat cushion, is provided, and that the cover is provided with an opening and auxiliary means by which it is ventilated in an effective manner. Also, the various parts necessary for ventilation can readily be removed so that the cover can be laundered.

Having thus described my invention, I claim:

1. A seat cover of flexible material having an upright crown portion with a top wall and front and rear walls depending from the front and rear, respectively, of the top wall, said crown portion being open at the bottom and adapted for detachably snugly accommodating interiorly the top portion of a cushioned seat back of an automobile seat with the top wall of the crown portion overlying the top edge of the seat back, a relatively stiff elongated hood, disposed on top of the top wall of the crown portion, said hood extending endwise of the hood from the outboard edge of the crown portion in the inboard direction for the major portion of the length of the crown portion, said hood having a top wall in overlying spaced relation to the top wall of the crown portion and having front and rear walls depending from the front and rear of the hood top wall and connected at their lower margins to the crown portion for supporting the hood on the top edge of the seat back when the cover is installed on a seat back, said top wall of the crown portion having passage means connected with the interior of the hood for admitting air from the hood to the rear face of the front wall of the crown portion at locations along the length of the hood, ventilating cushion means at the rear face of the front wall of the crown portion providing downwardly directed air conducting passage means for receiving and conducting air from the passage means of the top wall of the crown, said front wall having air discharge passage means therein for discharging air from said air conducting passage means at the forward face of the front wall of the crown portion, said hood being open at its outboard end and obstructed at its inboard end, an air scoop connected to the hood and having an open inner end discharging into the outboard end thereof and having an outer portion extending in the outboard direction from, and beyond, the outboard end of the hood, and said outer portion having a forward face for deflecting air striking said face in the inboard direction along the scoop into the hood.

2. The device of claim 1 wherein complementary means on the scoop and hood connect the scoop to the hood for adjustment of the scoop endwise of the hood so that the outboard end of the scoop can be positioned selectively to be inside and outside the plane of an automobile window adjacent the seat back on which the cover is installed.

3. The device of claim 1 wherein the scoop is resilient self-restoring material and reinforces the hood against lateral collapse.

4. A seat cover of flexible material having an upright crown portion with a top wall and front and rear walls depending from the front and rear, respectively, of the top wall, said crown portion being open at the bottom and adapted for detachably snugly accommodating interiorly the top portion of a seat cushion of a seat back of an automobile seat with the top wall of the crown overlying the top edge of the seat back, a relatively stiff elongated hood disposed on the top of the top wall of the crown portion, and having a top wall in overlying spaced relation to the top wall of the crown portion and having front and rear walls depending from the front and rear of the hood top wall and connected at their lower margins to the crown portion for supporting the hood on the top edge of the seat back when the cover is installed on the seat back, said hood extending endwise of the outboard edge of the crown portion in the inboard direction for the major portion of the length of the crown portion, said hood having passage means at the bottom for discharging air from the hood, said crown having a portion of its front wall in the form of a flap extending downwardly from the lower edge of the hood front wall a substantial distance below the top wall of the crown portion and spaced forwardly from the upper portion of the seat engaging wall portion of the crown portion near the top of the seat for a material part of the distance between the lateral edges of the crown portion, said flap being secured at its ends to the crown portion and being unsecured between its ends to the crown portion from the lower margin of the flap upwardly to form a downwardly open pocket in communication at its upper end with said passage, and in which the upper end portion of a ventilating seat cushion means can be accommodated for receiving said air discharge through said passage means, said hood being open at its outboard end and obstructed at its inboard end, an air scoop connected to the hood and having an open inner end discharging into the outboard end thereof and having an outer portion extending in the outboard direction from, and beyond, the outboard end of the hood, and said outer portion having a forwardly exposed face for deflecting air striking said face in the inboard direction along the scoop into the hood.

5. The structure according to claim 1 wherein brace means are hingedly connected to the hood portion and are adjustable to extend downwardly rearwardly therefrom, and cooperable brace retaining means are provided on the crown for engaging the lower portion of the brace means and securing the brace means in operative position in which they resist rearward folding of the hood portion.

6. The structure according to claim 1 wherein the hood includes an outer wall of flexible material connected to the cover and an insert in the form of an elongated, inverted channel of flexible, relatively stiff, resilient self-restoring material, and the channel is snugly received within said outer wall in fitting relation to the top, front, and rear of said outer wall.

7. The structure according to claim 6 wherein the channel is held in contracted condition in the outer wall and is frictionally held in the outer wall by the self-restoring expansive force of the channel.

8. The structure according to claim 1 wherein the scoop is telescopically mounted in the hood for sliding adjustment endwise of the hood to dispose the outboard end of the scoop at preselected distances from the outboard end of the hood.

9. The structure according to claim 1 wherein ventilating cushion means extend from adjacent the lower side of the hood downwardly and are juxtaposed against the rear face of the front wall of the crown portion, and said air conducting passage means extend downwardly from the passage means of the top wall of the crown portion and open forwardly.

10. The structure according to claim 9 wherein the cover includes a seat portion extending from the lower edge of the front portion and adapted to lie on the top of the seat cushion, and the ventilating cushion means continues from the lower end of the front portion and underlies said seat portion.

11. The structure according to claim 9 wherein the air conducting passage means comprise forwardly open troughs extending downwardly from adjacent the lower side of the hood and spaced apart from each other in a direction from the outboard side to the inboard side of the cover.

12. The structure according to claim 11 wherein the ventilating cushion means are yieldable foam rubber strips in laterally spaced relation to each other.

13. The structure according to claim 1 wherein said front wall of the crown portion is adapted to extend to the lower end of the seat back, said cover has a seat portion extending from the lower edge of the front wall of the crown portion and adapted to overlie a seat cushion, the ventilating cushion means at the unexposed face of the cover are extended for conducting air from the scoop downwardly along the rear of the front wall of the crown portion and forwardly along the underside of the seat portion, and for discharging the air through said front wall of the crown portion and through the seat portion, said ventilating cushion means has passage means leading to, and discharging at, the front edge of the seat portion, and a flap of material is secured to the seat portion and arranged to be moved into and out of obstructing relation to outlets of the last mentioned passage means at the front edge of the seat portion.

References Cited in the file of this patent

UNITED STATES PATENTS

| | | |
|---|---|---|
| 1,475,912 | Williams | Nov. 27, 1923 |
| 2,791,956 | Guest | May 14, 1957 |
| 2,931,286 | Fry et al. | Apr. 5, 1960 |
| 2,978,972 | Hake | Apr. 11, 1961 |